US010046234B2

(12) United States Patent
Perdigón Rodriguez et al.

(10) Patent No.: US 10,046,234 B2
(45) Date of Patent: Aug. 14, 2018

(54) INTERACTIVE MOVEMENT TRACKING SYSTEM APPLICABLE TO ARTICLES OF CLOTHING

(71) Applicant: OBE Gaming Inc., San Francisco, CA (US)

(72) Inventors: Angelo Antonio Perdigón Rodriguez, Mexico City (MX); Linda Paola Lobato Franco, Mexico City (MX); Juan Pedro Gil Alonso, Girona (ES); Daniel Fernández de Cordova Shore, Mexico City (MX); Henry Serrano Echeverria, Yucatan (MX); Frederic Zoller Chesler, Mexico City (MX)

(73) Assignee: OBE Gaming Inc., San Francisco, CA (US)

( * ) Notice: Subject to any disclaimer, the term of this patent is extended or adjusted under 35 U.S.C. 154(b) by 102 days.

(21) Appl. No.: 14/957,559

(22) Filed: Dec. 2, 2015

(65) Prior Publication Data
US 2017/0106277 A1 Apr. 20, 2017

(30) Foreign Application Priority Data
Oct. 20, 2015 (MX) .................... MX/u/2015/000511

(51) Int. Cl.
*A63F 13/285* (2014.01)
*G08B 6/00* (2006.01)
*G06F 3/01* (2006.01)

(52) U.S. Cl.
CPC ............ *A63F 13/285* (2014.09); *G06F 3/011* (2013.01); *G08B 6/00* (2013.01)

(58) Field of Classification Search
CPC ........ A63F 13/25; A63F 13/28; A63F 13/285; G06F 3/011; G08B 6/00
See application file for complete search history.

(56) References Cited

U.S. PATENT DOCUMENTS

| 2010/0098270 | A1 | 4/2010 | Abolfathi et al. |
| 2010/0286546 | A1 | 11/2010 | Tobola et al. |

(Continued)

FOREIGN PATENT DOCUMENTS

| CN | 202819726 U | 3/2013 |
| CN | 103040142 A | 4/2013 |

(Continued)

OTHER PUBLICATIONS

International Search Report and Written Opinion dated Feb. 3, 2017 for International Application No. PCT/US2016/057881, 12 pages, International Searching Authority/KR, Daejeon, Republic of Korea.

(Continued)

*Primary Examiner* — Damon Pierce
(74) *Attorney, Agent, or Firm* — Procopio, Cory, Hargreaves & Savitch LLP (57) ABSTRACT

The present disclosure relates to an interactive movement detection system applicable to articles of clothing that allows a user to interact with virtualized controllable environments such as the graphical programming environments of personal computers and/or those generated by video game consoles. Similarly, the system of example implementations of the present disclosure allows feedback of actions to the system in the form of impulses that generate pressure and/or vibration sensations that simulate interaction with elements of the controllable interface.

13 Claims, 8 Drawing Sheets

(56) References Cited

U.S. PATENT DOCUMENTS

| | | | | |
|---|---|---|---|---|
| 2012/0250272 A1* | 10/2012 | Wang | ............... | H04M 1/18 361/752 |
| 2014/0070957 A1* | 3/2014 | Longinotti-Buitoni | ............... | A61B 5/6804 340/870.01 |
| 2014/0142459 A1 | 5/2014 | Jayalth et al. | | |
| 2016/0113581 A1* | 4/2016 | Amir | ............... | A61B 5/6804 600/301 |

FOREIGN PATENT DOCUMENTS

| | | |
|---|---|---|
| CN | 203662042 U | 6/2014 |
| CN | 203789183 U | 8/2014 |
| DE | 10047533 A1 | 4/2002 |
| MX | 2008012209 A | 4/2009 |
| WO | 1999064657 A2 | 12/1999 |
| WO | 2002040091 A2 | 5/2002 |
| WO | 2009034218 A1 | 3/2009 |
| WO | 2011131235 A1 | 10/2011 |
| WO | 2015035247 | 3/2015 |
| WO | 2015083183 | 6/2015 |
| WO | 2015088863 A2 | 6/2015 |

OTHER PUBLICATIONS www.oetscher.com, Intelligente Bekleidung "Die Zukunfit in der Bekleidung—Smart Clothes", 2 pgs. retrieved Dec. 2, 2015, URL: http://www.oetscher.com/nc/en/knowledge/articles-about-workwear/smart-clothes.

Community of Lights, Intelligent Clothing, retrieved on Dec. 2, 2015, 12 pgs, URL: http://communityoflights.com/inventions/intelligent-clothing.

* cited by examiner

INTERACTIVE MOVEMENT TRACKING SYSTEM APPLICABLE TO ARTICLES OF CLOTHING

CROSS-REFERENCE TO RELATED APPLICATIONS

This claims benefit of priority from Mexican Patent Application Ser. No. MX/u/2015/000511, filed Oct. 20, 2015, the contents of which are incorporated by reference.

FIELD

The present invention relates to a movement tracking system and more particularly a movement tracking system with interactive capacities that allows feedback to the user of mechanical impulses.

BACKGROUND

Movement detection systems usable by a human body have a variety of potential uses. Related art systems often have sensors in located in equipment used by an operator, in order to detect changes caused by the movement of the equipment in order to transmit signals from the sensors to a control system, for example, a virtual reality environment. These related art virtual reality environments can be immersive environments, frequently associated with a three-dimensional environment created by a computer, and can be manipulated through helmets, gloves or other devices that capture the position and rotation of different parts from the human body. However, in these related art systems, these equipment and sensors are restricted to only a single part of the user's body, requiring a separate piece of equipment and sensors be used to track the positioning of each of the parts of the body. Additionally, the majority of the related art devices do not have means to provide feedback to the equipment from the virtual reality environment, for the purpose of simulating physical contacts with simulated objects.

One related art approach to provide more direct interaction with a user's anatomical forms is equipment called "intelligent" or "interactive" "clothes," which may be used to measuring biomedical parameters of a wearer. These "clothes" may function as a unit to record various biometric measurements such as heart rate, pulse or number of steps taken, and may having applications in the medical field for measuring vital signs such as temperature and blood pressure and in the sports field for measuring calorie expenditure.

These related art intelligent clothes may display connectivity with other electronic devices like cell phones using an apps or other computer interface. These related art clothes use sensors only for measuring the estimated manner of steps and movements carried out by the user. An example of this type of device is described, for example, in patent CN 203789183 to Zhejiang University of Science and Technology, which describes intelligent outdoor clothes for monitoring blood pressure and heart rate. This related art clothing includes an outer layer of cloth and an inner layer of cloth, and includes an intelligent electronic automatic blood pressure monitor, with wireless Bluetooth connectivity, a waist heart rate monitor with Bluetooth connectivity, and a rechargeable power source to provide power for the blood pressure monitor and waist heart rate monitor. The blood pressure monitor and waist heart rate monitor may be connected with a smart phone or other computer device through a Bluetooth connection. Nevertheless, this related art device does not allow tracking the movements of the operator with values picked up by the sensors and also does not allow for active feedback of interactions.

Related art patent CN203662042 describes intelligent articles of clothing for monitoring and alarm that includes an inner pocket sewn on the inside of the body of the garment, and intelligent host equipment arranged in the inner pocket that include a CPU, a GPS locator, an electronic gyroscope, a Bluetooth receiver, a processor for monitoring heart rate in real time. The intelligent clothing also includes a module for sending an emergency text message, including information from the GPS locator, the electronic gyroscope, and the measured heart rate in real time under appropriate circumstances. These related art clothes have functions for intelligent monitoring heart rate and location in real time and transmitting of emergency information based on the measured heart rate and location. However, these related art clothes do not function as a controller of a virtual environment, because they lack means for detecting the relative position of the user's limbs or body parts.

Related art patent application US 2014/142459 A1 relates, generally, to computer programs, movable electronics, wireless communication connections and monitoring systems usable as clothes. More specifically, related art techniques, systems, sensors, circuits, algorithms, and methods for monitoring devices usable as clothes and apparatuses associated with exercising are described. In this related art application, a system of sensors in clothes capable of collecting data on the performance of a user during exercise is described. In the related art system, the data can be analyzed in real time, and feedback can be supplied to the user based on analysis of the obtained data. The analysis can be used to modify the user's behavior and/or an apparatus to which the user is connected during an activity, like exercise, conditioning, therapy, etc. In this related art system, a piece of exercise equipment can be arranged and in communication with the sensor system or another system and can be controlled in real time to adjust the configuration to affect the user during the exercise routine. However, in this related art system, the interaction is limited solely to instructions for changing the intensity of the routine or stopping the routine in case the vital signs of the operator exceed or fall below predetermined threshold values. Additionally, in the related art system active monitoring of the relative position of the user's limps or body parts is not performed, nor is there any to send direct instructions in real time to the attached equipment in order to carry out voluntary control of the equipment in real time.

Other related art clothes use an exercise computer with a connection via cellular communication sewn within sports underclothes. In this way, it is possible to show on a telephone, for example, heart rate signals and other data. Moreover, athletes can send their training data via Internet to their PC, in which they can plan and analyze their exercise program with the aid of software. This type of garment uses inertial movement sensors and biomedical sensors to carry out the measurement or monitoring. However, in these related art clothes the possibility is not contemplated that the sensors be distributed in different parts of the body, nor is there any consideration of providing the sensation of vibration during the user's interaction with the garment. That is, the clothes of the related art do not have means to receive a stimulus coming from a controllable environment that simulates direct interaction with virtual objects, providing kinesthetic sensations to the user, such as the insertion of haptic sensors, and much less allow the detection in real time of the relative position of each of the extremities to determine a spatial relationship with respect to an external system of virtualized references, nor allow direct control of the interface by means of conscious actions of the user. Due to what is mentioned above, the clothes described in the documents of the related art could not be used as an effective control system for a controllable graphical environment, like that which is found in video game systems.

SUMMARY

One aspect of the present disclosure may provide an interactive movement detection system connectable to articles of clothing that allows the user to directly interact with data collection systems and/or programming environments, by detection of the relative position of the user's extremities and rib cage by means of the use of inertial sensors and that, in addition, allows feedback of impulse stimuli coming from the data collection systems and/or programming environments, through impulse generator devices such as haptic sensors and the conscious control of actions.

Another aspect of the present disclosure application may provide an interactive system with a plurality of movement sensors connected to a central processing unit with watertight structure of confinement to avoid the entrance of substances foreign to the system.

An additional aspect of the present disclosure application may provide an article of clothing that integrates the proposed movement detection system that is ergonomic and allows detection of the relative position of the movements of the extremities and trunk of a user.

Another aspect of the present disclosure application may provide an article of clothing that detects, in addition, the user's biometric values, such as heart rate, temperature and/or any other susceptible to being measured with body sensors, to be sent to a controllable interface from which feedback is received capable of modifying the user's behavior in the face of the stimuli received, such as an increase of the difficulty of video game in the presence of an increase or decrease of the heart rate recorded or the modification of the pace of a sports routine.

Yet another aspect may providing an article of clothing that can be used as a graphical programming environment controller and that, in addition, allows sending and receiving data through a wireless communication protocol such as, for example, Bluetooth, Wi-Fi or IR.

An additional aspect of the present disclosure application may provide a clothing outfit that serves as a physical controller of the interactions with a programming environment such as that of a video game and that, in addition, allows physical and virtual feedback of the actions performed by generation of impulses that can be felt by the user.

Some other aspects will be better and more completely understood by reference to the following detailed description of the present disclosure in conjunction with the accompanying drawings.

DETAILED DESCRIPTION

An example implementation of the present disclosure may provide an interactive movement detection system applicable to articles of clothing that includes a series of modules for detection and reception of data as well as generation of impulses, connected to a central processing unit by a single port. This portion may include suitable structures means for the connection of at least one detector unit, of at least one receptor unit and at least one impulse generator unit.

The system may be configured constructed in such a way that it can be placed inside conventional articles of clothing such as jackets, sweaters, jerseys, T-shirts, shirts, sweatshirts, windbreakers, sportswear, vests, safety and/or protective equipment, pants, footwear, caps and gloves.

Figure 1:
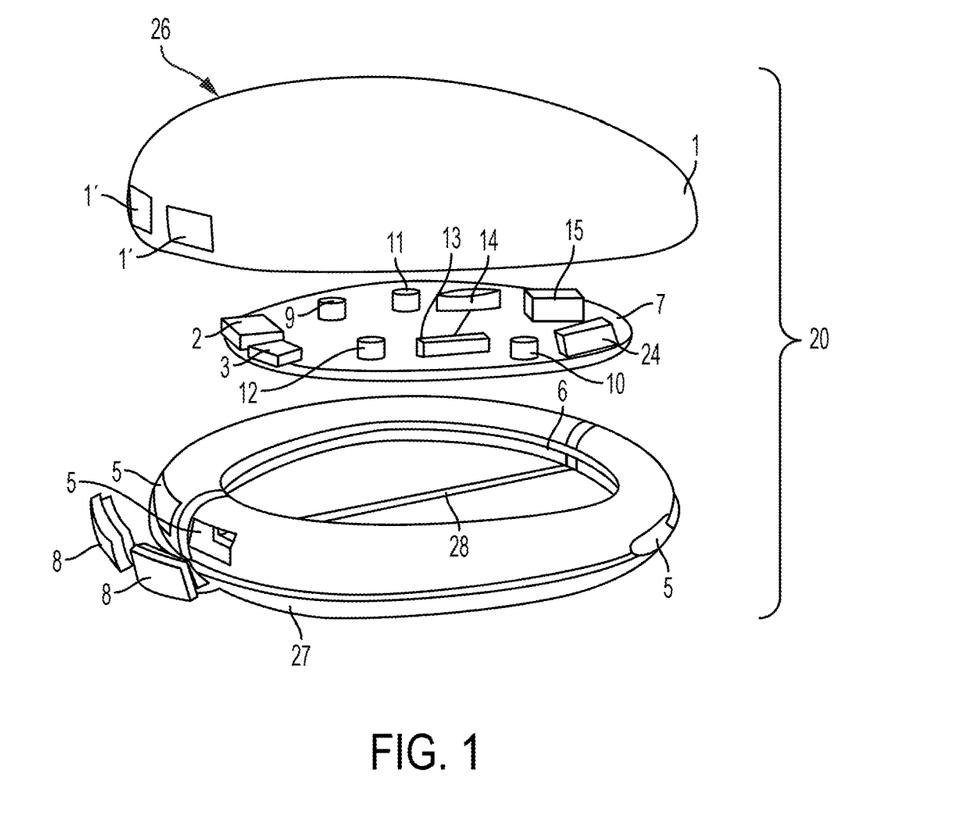
FIG. 1 shows an exploded view of the central control unit of an example implementation of the present application.
Figure 2:
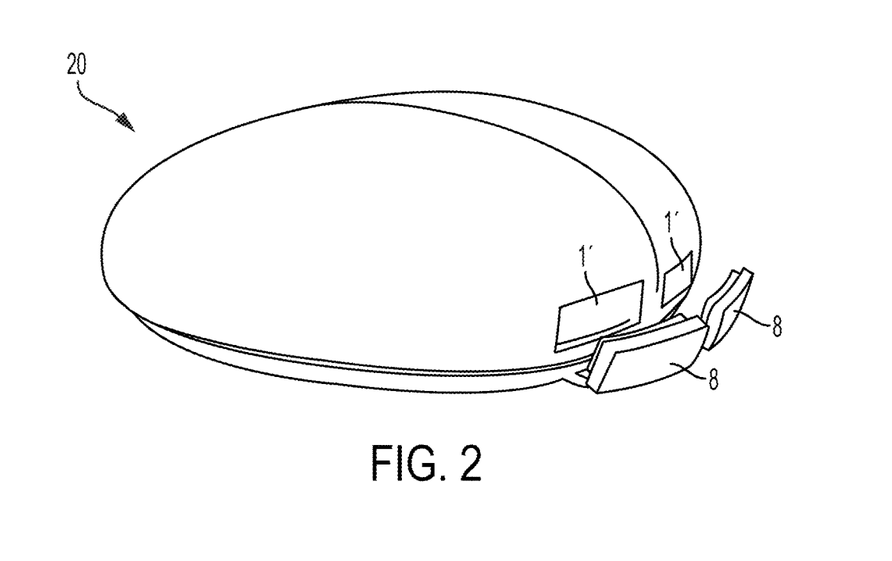
FIG. 2 shows a perspective view of the central control unit according to the example implementation of the present application.

The interactive movement detection system applicable to articles of clothing of the present disclosure includes of a central control unit with a watertight external cover. FIG. 1 shows an exploded view of the central control unit 20 of an example implementation of the present application. FIG. 2 shows a perspective view of the central control unit 20 according to the example implementation of the present application.

The central control unit 20 includes a lid 26 that a first opening 1 to access to a start/stop button 24 within the control unit 20 and two other openings 1' to allow access to a micro-Universal Serial Bus (USB) port 2 and a mini-High Definition Multimedia Interface (HDMI) port 3 located within the central control unit 20. The central control unit 20 also includes a base 27 having a central rib 28 that assists symmetrical bending, providing greater malleability in the handling of the central control unit 20, and generating more safety for the user due to the flexibility that this housing offers. The base 27 also includes three openings 5 that coincide with the openings in the lid and a rail 6 in the center of the base 27 to hold a microprocessor board 7. Two watertight lids 8 may be placed in the openings for accessing the micro-USB port 2 and the mini-HDMI Port 3 in order to cover these ports and to keep the central control unit 20 watertight.

The microprocessor board 7 may also include at least one micro vibration motor 9 to give a feedback sensation, at least one LED unit 10 that indicates the state of the system, at least one accelerometer 11, at least one infrared biometric sensor 12 (such as a pulsomometer or other sensor that may be apparent to a person of ordinary skill in the art), at least one charging port 13 and one central battery 14 that supplies power to the system.

Figure 5:
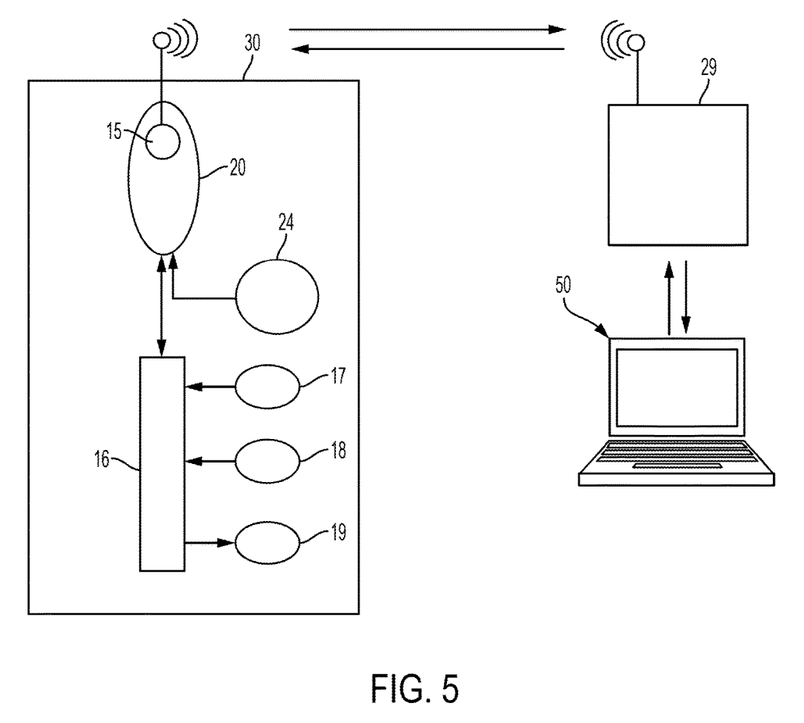
FIG. 5 shows a block diagram where the general control scheme of the movement detection system of the example implementation of the present application.

All the components of the microprocessor board 7 may be are controlled by software or a series of instructions stored in the central control unit 20, which are used to control the transmission of signals between various components of the central control unit 20, as well as other components of an interactive movement detection system incorporating the central control unit 20 via a wireless communication module 15, such as a Bluetooth 4.0 module, that allows the data traffic in both directions, The wireless communication module 15 may allow the interactive movement detection system to send and receive data to and from a computing device interface 29 providing an interactive virtual environment on a computing device 50, such as, a personal computer, a data collection station, a Web server, a virtual reality visor, an augmented reality visor and a video game console, as illustrated in FIG. 5 discussed below.

The central control unit 20 obtains its energy from the battery 14 that is charged by means of a charging port 13 by induction, so that it is not necessary to physically connect the central control unit 20 to any type of charger. This may allow increased autonomy of the system, since central control unit 20 can be charged by conventional induction by just approaching in the effective range of any charging station.

Figure 3:
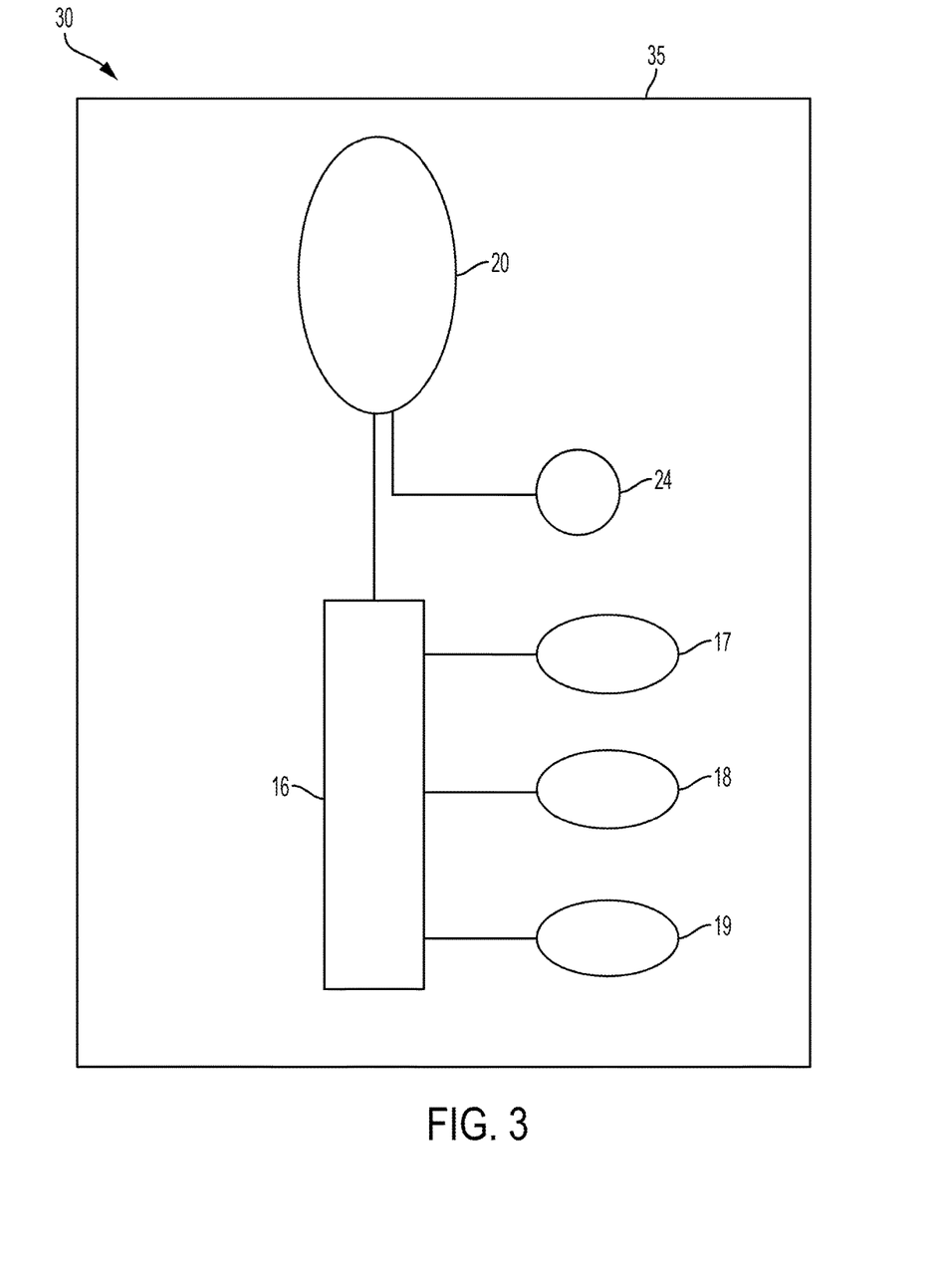
FIG. 3 shows a wiring diagram illustrating the interconnection of the central control unit with each of the modules and units that may comprise an interactive movement detection system of the example implementation of the present application.

FIG. 3 shows a wiring diagram illustrating the interconnection of the central control unit 20 with other components of an interactive movement detection system 30 of the present application. As illustrated, the central control unit 20 is connected by means of the mini-HDMI 3 to a communications control unit 16, which can allow connection to a variety of input devices. As illustrated, the communication control unit 16 allows the central control unit 20 to be connected to at least one movement detection module 17. The at least one movement detection module 17 may include, for example, an accelerometer that allows detecting movements in the "X", "Y" and "Z" axes, which can be interpreted by the system to determine the relative position of the limbs and/or torso of the operator.

The communication control unit 16 may also allow the central control unit 20 to be connected to at least one data receptor unit or User input device 18. The user input device 18 may be, for example, a switch or button that allows the user to interact with the system to generate a signal independent of the position of the operator. For example, the operator may use the user input device 18 to generate an action signal (like a trigger pull, or an open door action) in a video game. Other uses of the user input device 18 may be apparent to a person of ordinary skill in the art.

The communication control unit 16 may also allow the central control unit 20 to be connected to at least one impulse generator unit or feedback unit 19. The feedback unit 19 may be, for example, haptic sensors or motors that allow generation of a vibrating pulse that produces feedback from the system to the operator, giving the operation a sensation of immersion.

All the components mentioned above are located within a fabric or other flexible membrane 35. For example, the flexible membrane 35 may be any suitable material, including, for example, flexible textile material, that adapts ergonomically to the movements of the operator and that is placed in the inner lining of an article of clothing such as, for example, jackets, sweaters, jerseys, T-shirts, shirts, sweatshirts, windbreakers, sportswear, vests, safety and/or protective equipment, pants, footwear, caps and gloves.

In some example implementations, the central control unit 20 is placed in the central portion of the article of clothing in a place readily accessible to the user, for example, in the central posterior region of the upper part of the back in clothes like sweatshirts, T-shirts or jackets; in the region of the hips or near the waist in pants; in the central part of the visor of a cap; in the lateral parts of footwear; and in the region of the back of the hand in a glove. This location is preferably determined by the proximity of the central control unit 20 to each of the devices and sensors that compose the present system, so that these remain in a symmetrical position with respect to the central axis of the garment.

Further, in some example implementations, the at least one movement detection modules 17 are placed in the article of clothing near the bending points corresponding to the body joints, preferably in the regions corresponding to the wrists, forearms, elbows, shoulders, hips, knees, ankles and base of the neck.

Further, in some example implementations, the at least one data receptor unit 18 may be placed in turn near regions readily accessible to the user, so that he can operate them voluntarily for the purpose of carrying out control actions. For example, the data receptor unit 18 may be, for example, a button, a switch, or a pressure sensor, placed at the ends of sleeves, near the waist, or at the ankles, or any other area providing easy access by the operator.

In the case of the at least one impulse generator unit or feedback unit 19, its placement is based on the regions of the garment where it is required, in order to simulate events such as pressure or vibration caused by interaction with physical elements in order to simulate of mechanical interactions with the virtual surroundings. The at least one impulse generator unit 19 may be located in the regions of the garment that are located near highly sensitive regions of the user's body, such as the palms of the hands, or near regions where an action is better simulated, such as it would be to simulate a blow or a shot in an action game. For example, placement on the torso or trunk area of the clothing may be used to stimulate impacts from the virtual surroundings. Similarly, location at the ends of sleeves or legs may be used to simulate interaction relating to touching the virtual surrounding.

In some example implementations, the at least one impulse generator unit 19 may include a network or mesh of haptic sensors or motors distributed throughout the clothing to allow stimulation of feedback in different locations simultaneously for a fully immersive experience.

Further, in some example implementations the impulse generator unit or feedback unit 19 may also include mechanisms for simulating other touch related experiences. For example electric heating or cooling plates may be used to simulate temperature changes, fans may be used to simulate a breeze, or other moving wind. Other simulated sensory experiences may be apparent to a person of ordinary skill in the art.

In some example implementations of the present system, sensors specialized in biometric parameters can, moreover, be connected to the communication control unit 16, for the purpose of detecting the vital signs of the operator, recording the values associated with the operator's temperature, heart rate, blood pressure and/or his oxygen saturation level, or any other measurable parameters, for the purpose of sending them to the central control unit 20 of the system, to be processed and sent wirelessly to the computing device interface 29 located, for example, in a movable piece of equipment like a personal computer or a cell phone.

Once the system is located in the selected article of clothing, it allows sending the data obtained, by means of the wireless communication module 15 to a controllable system or a system for handling and processing data to interact with the system of the present disclosure. The signals originating from each of the components are interpreted, in order to be executed as instructions either of a graphical programming environment and/or as obtained biometric data that can be stored temporarily or permanently in a storage unit, from which they can be consulted to determine the operator's state of health.

Figure 4:
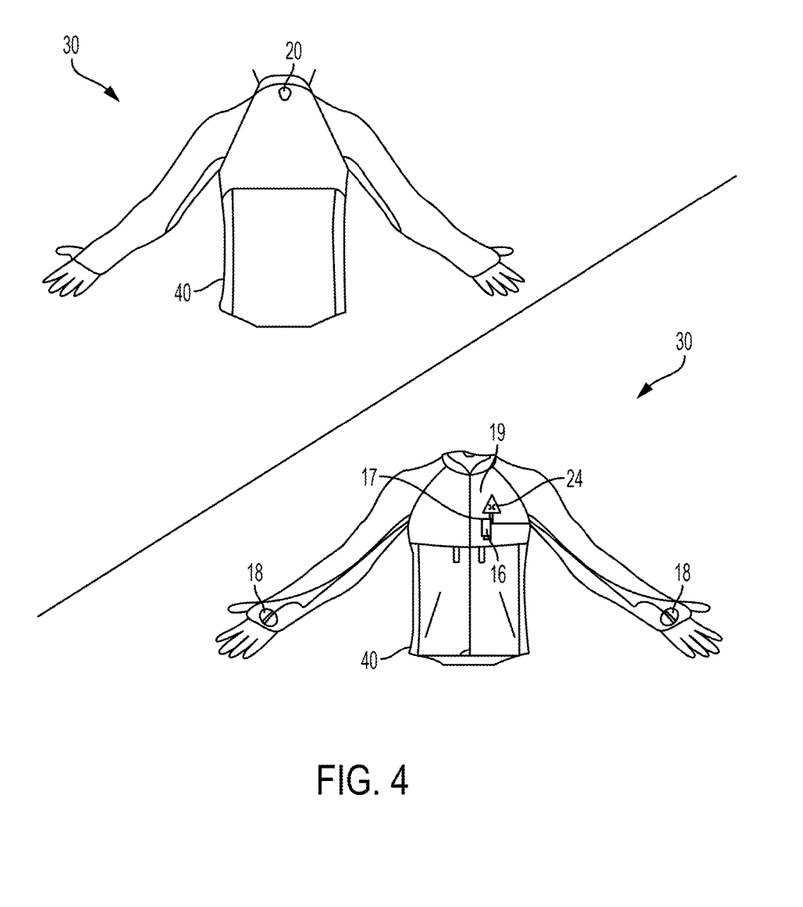
FIG. 4 shows an interactive movement detection system according to an example implementation integrated into an article of clothing.

FIG. 4 shows an interactive movement detection system 30 according to an example implementation integrated into an article of clothing 40. In this example implementation, the system 30 is applied to a jacket 40, the central control unit 20 being placed in the region corresponding to the user's back, whereas the at least one movement detection module 17 is located in the region of at least one of the chest, forearms, shoulders and waist. Further, at least one data receptor unit 18 is located in each cuff of the jacket 40 in an extension for insertion of a thumb, such that the data receptor unit 18 is located near the area corresponding to the palm of the user's hand. Finally, the at least one impulse generator unit (19) is placed in at least one of the selected regions such as the forearms, chest region, back, neck region, lumbar region and waist region in order to generate contact sensations such as pressure or vibration. Other sensations such as hot and cold, or wind blowing may also be provided.

FIG. 5 shows a block diagram where the general control scheme of the movement detection system 30 of the present application. With reference to FIGS. 4 and 5, the interactive movement detection system 30 of the present application functions by the user puts on the article of clothing 14 and proceeds to activate the central control unit 20 of the system by means of the start button 24, which may be located apart from the central control unit 20 and connected by wired or wireless connection the start button 24 activates the central control unit 20 and sends a signal through the wireless communication module (15) to allows synchronizing the system 20 with the computing device interface 29 providing the controllable virtual environment on a personal computer, a movable device, a database and/or a video game console.

Once the system 30 is synchronized with the computing device interface 29 providing the controllable virtual environment, the user through his movements, detected by the at least one movement detection module 17, interacts with the graphical control elements displayed by the controllable system such as, for example, pointers, graphical programming interfaces or video game avatars, carrying out the selection or other actions by activation of the at least one data receptor unit 18.

Further, the computing device interface 29 sends a feedback to the system 30 in the form of impulses sent through the same wireless communication module 15. The impulses can be interpreted by the central control unit 20 to be transformed into signals that activate the at least one impulse generator or feedback units 19, through a vibration, a generated pressure sensation, or other sensor experience, indicates to the user that he has interacted with an object of the computing device interface 29 providing the controllable virtual environment. For example, a notification of action in a video game, such as, receiving a shot, a blow, or the sensation of vibration of the body of an automobile, may be provided, allowing more realistic immersion with the virtualized surroundings.

Further, along with the received feedback from the computing device interface 29 providing the controllable virtual environment, the system of the present application obtains information from biometric sensors in the form of measurements of temperature, blood pressure, or pulse, sending this information through the wireless communication module to the computing device environment in which the data can be interpreted. The data from the biometric sensors can be used to as feed back to the system 30 to modify, for example, the intensity of an exercise routine based on a detecting an increase of the heart rate in order to avoid injuries, or accelerating the frequency of the actions in a video game if the system 30 detects that the user has a low pulse or heart rate to in incite the user to perform greater physical activity.

Figure 6:
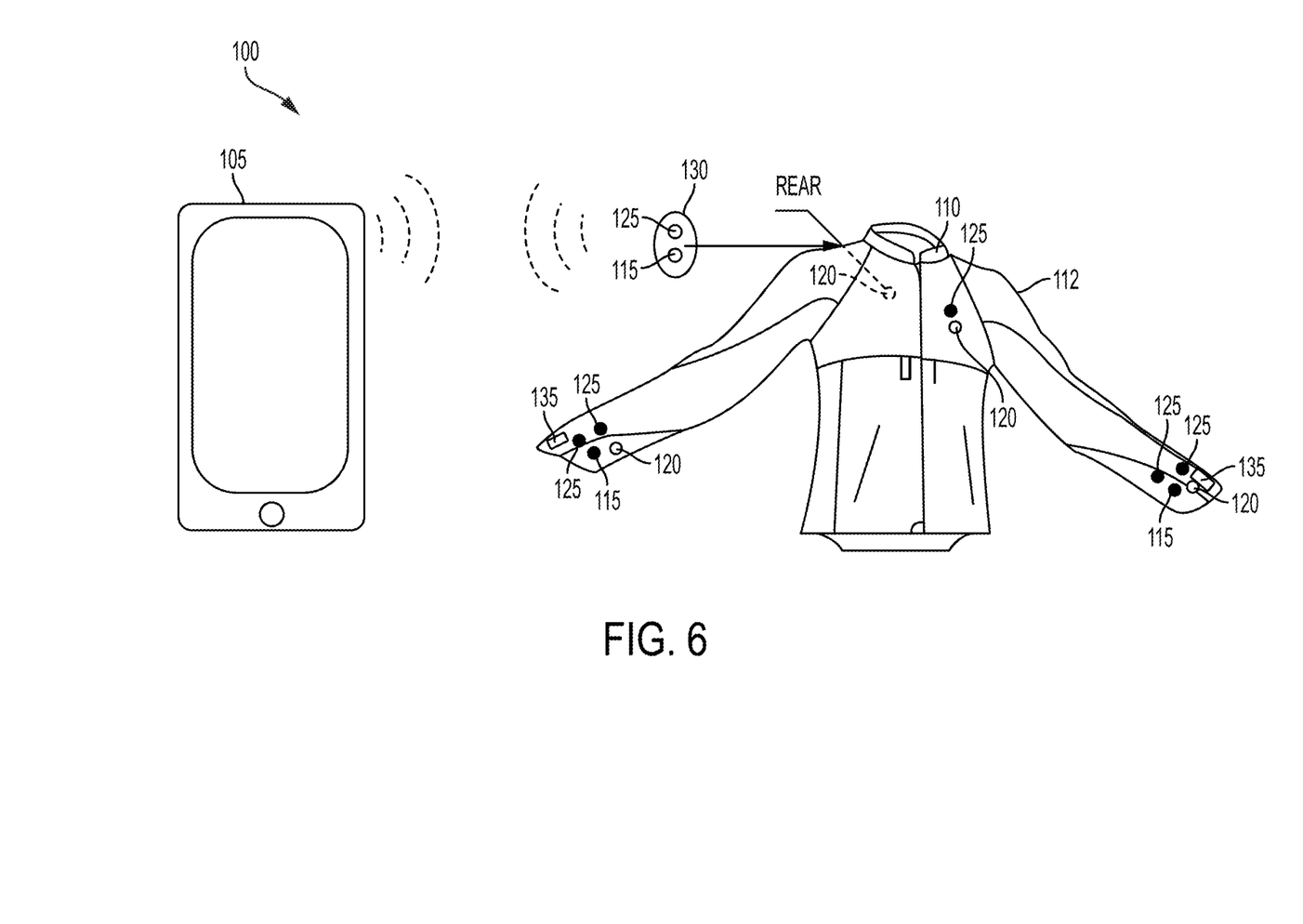
FIG. 6 illustrates the interaction between a computing device and an article of clothing having an integrated movement detection of the example implementation of the present application.

FIG. 6 illustrates the interaction between a computing device 105 and an article of clothing 112 having an integrated movement detection system 110 of according to another example implementation of the present application. The system 110 of the example implementation of FIG. 6 may have a similar operation to the system discussed above with respect to FIGS. 1-5.

As illustrated the system 110 includes a removable central control unit 130 configured to attached to a portion of the article of clothing 112. In some example implementations, the removable control unit 130 may be connected to the upper back of the article clothing 112. The central control unit 130 includes one or more LEDs 115 configured to indicate a status of the central control unit 130. The central control unit 130 may also have one or more buttons or interaction devices 120 configured to allow operation of the central control unit 130, such as powering up, powering down, resetting, or any other operation that may be apparent to a person of ordinary skill in the art. The central control unit 130 may also include a wireless communication device (not labeled) capable of wirelessly communicating with a computing device 105. Wired communication between the central control unit 130 and the computing device 105 may also be performed in some example implementations of the present application.

Further, the control unit 130 may also be configured to be placed over a haptic feedback device 120 to control the haptic feedback device 120 and communicate through the haptic feedback device 120 to other areas of the system 110. The haptic feedback device 120 may include a motor, vibration element, or pressure generation device configured to generate a physical or mechanical sensory experience for a user. The haptic feedback device 120 may also include electric heating or cooling plates to simulate hot and cold temperatures, or fans for generating wind or other moving air sensory experiences.

The system 110 also includes another haptic feedback device 120 and one or more buttons or interaction devices 125 located on the front upper chest of the article of clothing 112. Again, the haptic feedback device 120 may also include electric heating or cooling plates to simulate hot and cold temperatures, or fans for generating wind or other moving air sensory experiences.

Further, an additional LED 115, an additional haptic feedback device 120, and at least a pair of buttons or interaction devices 120 may be provided at the cuffs or sleeves of the article of clothing 112. Further, a motion or position detecting sensor 135 may also be provided in each cuff or sleeve of the article of clothing 112. The motion or position detecting sensor 135 may include one or more accelerometers or other sensors configured to measure and sense the positioning and movement of the limbs of the user.

Similar to the operation of the system 30 illustrated in FIGS. 1-5 discussed above, the system 110 of FIG. 6 may communicate measured input signals from the motion or position detecting sensors 135 and the buttons or interaction devices 120 to the central control unit 130, which processes the signals and sends data to the computing device 105 allowing the user to control an interface on the computing device. Further, the computing device 105 may send feedback signals to the central control unit 130 based on the user's control of the interface. The central control unit 130 may interpret the feedback signals to control the haptic feedback devices 120 to simulate a sensory experience for the user based on the user's control of the interface. For example, impacts or vibrations may be simulated to provide an immersive experience with the interface.

Figure 7A:
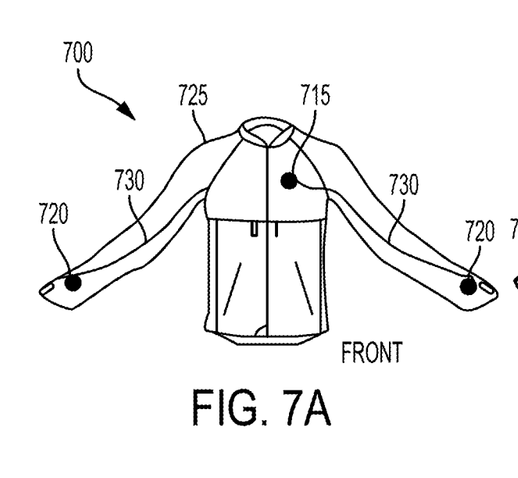
FIGS. 7A-7C illustrate another example implementation of an integrated movement detection system of the present application.
Figure 7B:
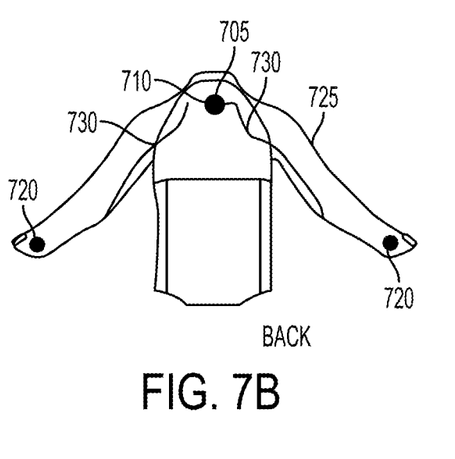
Figure 7C:
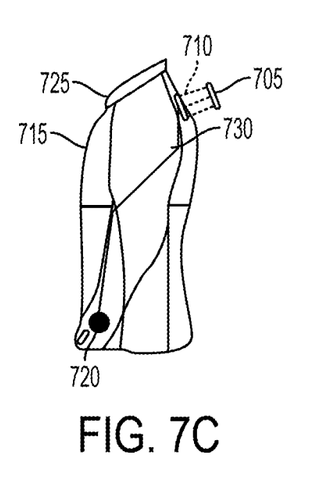

FIGS. 7A-7C illustrate another example implementation of an integrated movement detection system 700 of the present application, similar to those discussed in FIGS. 1-6 above. In this example implementation, the system includes five separate modules (a removable back module 705, a fixed back module 710, a chest module 715 and a pair of sleeve or arm modules 710) connected by integrated leads 730 running within the layers of article of clothing 725. The integrated leads 730 may be micro-filament signal cables, standard size signal cables, or any other signal carrying lead that may be apparent to a person of ordinary skill in the art. Further, in some example implementations, the integrated leads 730 may be formed by printing leads using conductive ink on a later of the cloth of the article of clothing 725.

The removable back module 705 is positioned on an upper portion of the back of the article of clothing and is configured to attach to the fixed back module 710. The attachment between the fixed back module 710 and the removable back module 705 may be achieved by magnetic contact connectors configured to provide both mechanical attachment as well as electrical communication between the removable and fixed back modules 705, 710. As discussed below, the removable back module 705 provides power to the system 700 via a battery and communications with a wireless communication device such as a Bluetooth transceiver as discussed below with respect to FIG. 9. The removable back module 705 may act as the "brain" of the system 705 by controlling the other modules.

The fixed back module 710 may relay signals from the removable back module 705 via the integrated leads 730. The fixed back module 710 may also be one source of haptic feedback to the user of the system 700 as discussed in greater detail below with respect to FIG. 8. Further in some example implementations, either the fixed back module 710 or the removable back module 705 may provide position and/or movement detection of the torso or trunk of a user of the system for the system 700.

The chest module 715 is connected to the fixed back module 710 by the integrated leads 730. The chest module 715 may also provide haptic feedback and also provide a user input device to allow a user to activate, deactivate, or synchronize the system 700 as discussed below with respect to FIG. 11.

Each of the sleeve or arm modules 720 is also connected to the fixed back module by the integrated leads 730. Each sleeve or arm module 720 may also provide haptic feedback for the system 700, and may also provide position and/or movement detection of the limbs of the user of the system 700. Each sleeve or arm module 720 may also provide a pair of user input devices to allow the user to interact with the system as discussed below with respect to FIG. 10.

Figure 8:
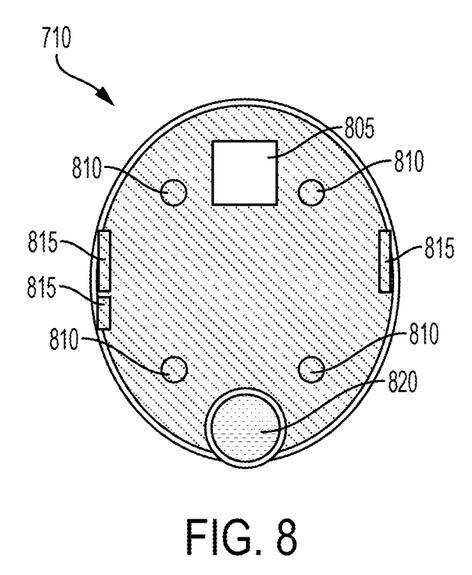
FIG. 8 illustrates the fixed back module of the other example implementation of an integrated movement detection of the example implementation of the present application.

FIG. 8 illustrates the fixed back module 710 of the other example implementation of an integrated movement detection system 700 of the present application. The fixed back module may function as a signal distribution device in the system 700. Specifically, the fixed back module 710 may include a processor 805 that can control signal distribution within the system by sending to and receiving signals from the removable back module 705 by magnetic contact connectors 810. The magnetic contact connectors 810 may provide both mechanical and electrical connection between the removable back module 705 and the fixed back module 710. In some example implementations, the processor 805 may also include an integrated accelerometer or other sensor configured for measuring position and/or movement of the torso of the user of the system 700.

The fixed back module 710 may also send signals to and receive signals from the chest module 715 and the sleeve or arm modules 720 using the integrated leads 730 running through the article of clothing 725. The integrated leads 730 may connect to the fixed back module 710 via wired connectors 815. The wired connectors 815 are not particularly limited and may include HDMI connectors, USB connectors, or any other type of connector that may be apparent to a person of ordinary skill in the art.

The fixed back module 710 also includes a haptic feedback device 820. The haptic feedback device 820 may include a motor, vibration device, pressure generating device, or any other device that may be apparent to a person of ordinary skill in the art for generating mechanical sensory experience to a user. The haptic feedback device 820 may also include electrical heating or cooling elements configured to generate hot and cold sensations, fans or air moving devices configured to generated wind or air moving sensations, or any other sensory stimulating device that may be apparent to a person of ordinary skill in the art.

Figure 9:
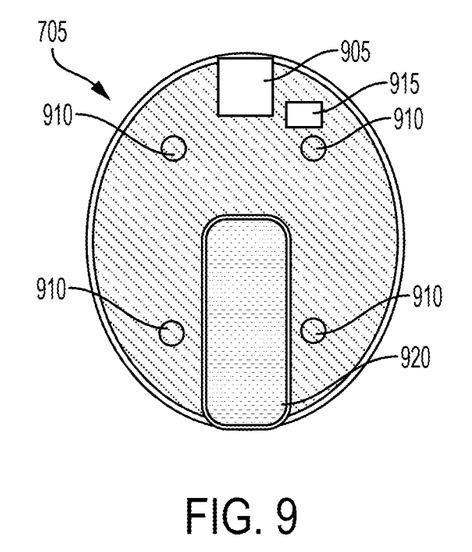
FIG. 9 illustrates the removable back module of the example implementation of an integrated movement detection system of the present application.

FIG. 9 illustrates the removable back module 705 of the example implementation of an integrated movement detection system 700 of the present application. The removable back module 705 may function as a brain and external communication device for the system 700. Specifically, the removable back module 705 may include a processor 905 that control the other modules of the system 700 and coordinate signals to a connected computing device via a wireless communication transceiver 915. The wireless communication transceiver may be a Bluetooth device, a WI-FI device, or any other communication device that may be apparent to a person of ordinary skill in the art. In some example implementations, the processor 905 may also include an integrated accelerometer or other sensor configured for measuring position and/or movement of the torso of the user of the system 700.

Further, removable back module 705 also includes magnetic contact connectors 910 to send signals to and receive signals from the fixed back module 710. The magnetic contact connectors 910 may provide both mechanical and electrical connection between the removable back module 705 and the fixed back module 710.

The removable back module 705 may also include a battery or power cell 920 configured to provide power to the system via the magnetic contact connectors. In some example implementations, the battery or power cell may be configured for inductive charging eliminating the need for a charging port. In other example implementations, a charging connector may also be provided on the removable back module.

Figure 10:
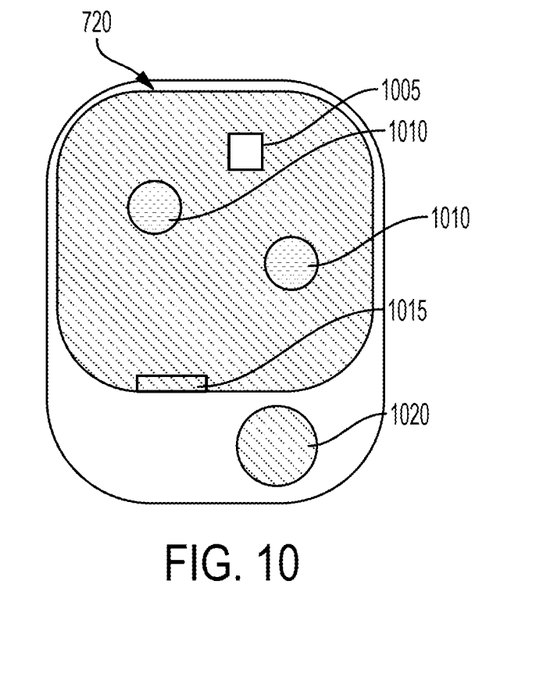
FIG. 10 illustrates the sleeve or arm module of the other example implementation of an integrated movement detection system of the present application.

FIG. 10 illustrates the sleeve or arm module 720 of the other example implementation of an integrated movement detection system 700 of the present application. The sleeve or arm module 720 includes an integrated accelerometer or other sensor 1005 configured for measuring position and/or movement of the limbs of the user of the system 700. The sleeve or arm module 720 also includes at least two user input devices 1010 to allow a user to generate and send an input signal. The input devices 1010 may include buttons, switches, touch pads, or any other input device that may be apparent to a person of ordinary skill in the art.

Further, each sleeve or arm module 720 may be connected to the fixed back module 710 to exchange signals using the integrated leads 730 running through the article of clothing 725. The integrated leads 730 may connect to each sleeve or arm module 720 via wired connectors 1015. The wired connectors 1015 are not particularly limited and may include HDMI connectors, USB connectors, or any other type of connector that may be apparent to a person of ordinary skill in the art.

The each sleeve or arm module 720 also includes a haptic feedback device 1020. The haptic feedback device 1020 may include a motor, vibration device, pressure generating device, or any other device that may be apparent to a person of ordinary skill in the art for generating mechanical sensory experience to a user. The haptic feedback device 1020 may also include electrical heating or cooling elements configured to generate hot and cold sensations, fans or air moving devices configured to generated wind or air moving sensations, or any other sensory stimulating device that may be apparent to a person of ordinary skill in the art.

Figure 11:
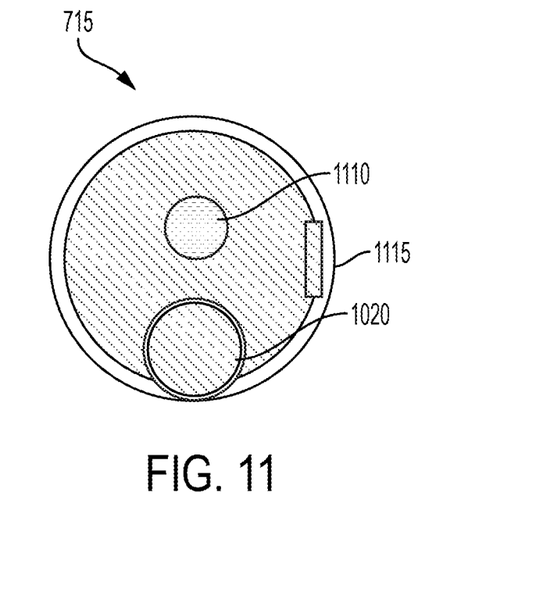
FIG. 11 illustrates the chest module of the other example implementation of an integrated movement detection system of the present application.

FIG. 11 illustrates the chest module 715 of the other example implementation of an integrated movement detection system 700 of the present application. The chest module 715 may include at least one user input device 1110 to allow a user to generate and send an input signal. The input device 1110 may include buttons, switches, touch pads, or any other input device that may be apparent to a person of ordinary skill in the art.

Further, the chest module 715 may be connected to the fixed back module 710 to exchange signals using the integrated leads 730 running through the article of clothing 725. The integrated leads 730 may connect to the chest module 715 via wired connectors 1115. The wired connectors 1015 are not particularly limited and may include HDMI connectors, USB connectors, or any other type of connector that may be apparent to a person of ordinary skill in the art.

The chest module 715 also includes a haptic feedback device 1120. The haptic feedback device 1120 may include a motor, vibration device, pressure generating device, or any other device that may be apparent to a person of ordinary skill in the art for generating mechanical sensory experience to a user. The haptic feedback device 1120 may also include electrical heating or cooling elements configured to generate hot and cold sensations, fans or air moving devices configured to generated wind or air moving sensations, or any other sensory stimulating device that may be apparent to a person of ordinary skill in the art.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

The invention claimed is:

1. An interactive movement detection system configured for attachment to an article of clothing, the interactive movement detection system comprising:
   a central control unit attached to a first region of the article of clothing comprising:
      a central processing unit;
      a watertight external cover defining a first opening providing access to a control button and one or more second openings providing access to one or more communications ports;
      a base comprising a central rib configured to facilitate symmetrical bending of the base, the base comprising:
         a plurality of openings, each opening oriented to align with one of the first opening and the one or more second opening; and
         a rail disposed in a central middle part of the base configured to support the central processing unit; and
      a pair of watertight lids configured to be inserted into the one or more second openings to cover these ports and to keep the central control unit watertight;
   at least one movement detection module communicatively coupled to the central control unit and attached to a second region of the article of clothing, the at least one movement detection module comprising at least one sensor configured to detect movements along three axes, wherein the central control unit is configured to detect a relative position of the second region of the article of clothing based on a first signal generated by the at least one movement detection module;
   at least one data receptor unit communicatively coupled to the central control unit and attached to a third region of the article of clothing, the at least one data receptor unit configured to generate and transmit a a second signal to the central control unit independent of a position of a wearer of the article of clothing and;
   at least one impulse generator unit communicatively coupled to the central control unit and attached to a forth region of the article of clothing, configured to generate a pulse based on a third signal from the central control unit to simulate an immersive sensation for the wearer of the article of clothing;
   a communication control unit configured to communicatively couple the central control unit to the at least one movement detection module, the at least one data receptor unit and the at least one impulse generator unit and;
   a membrane of flexible material disposed within an inner liner of the article of clothing, configured to adapt ergonomically to the movements of an operator, wherein each of the central control unit, the at least one movement detection module, the at least one data receptor unit, and the at least one impulse generator unit are located in the membrane, and
   wherein the central control unit is configured to automatically determine a type of each of the first signal, second signal, and third signal emitted by each of the at least one movement detection module, the at least one data receptor unit, and the at least one impulse generator unit and an outside emitter communicatively coupled to the central control unit, to carry out preprocessing of and distinguish between each first signal, second signal and third signal and couple to a wireless communication module to allow data traffic in at least two directions, enabling the system to send and receive the data to and from a computing device to allow interaction with the computing device and to generate the immersive sensations of immersion based on the signals received from the computing device.

2. The interactive movement detection system according to claim 1, wherein the central control unit is configured with to process received signals to allow communicative coupling with the computing device comprising at least one of a personal computer, a data collection station, a Web server, a virtual reality visor, an augmented reality visor and a video game console.

3. The interactive movement detection system according to claim 1, wherein the central control unit further comprises, within the watertight external cover,
 at least one micro vibration motor configured to provide a feedback sensation;
 at least one LED unit configured to indicate a state of the system;
 at least one accelerometer configured to detect changes in the position of the wearer of the article of clothing;
 at least one biometric sensor configured to measure a biometric reading of the wearer of the article of clothing;
 at least one charging port;
 a central battery configured to provide power to the system and
 the wireless communication module to send and receive data from the computing device.

4. The interactive movement detection system according to claim 1, wherein the central control unit comprises a battery configured for inductive charging via non-physical connection to the central control unit.

5. The interactive movement detection system according to claim 1, wherein the first region of the article of clothing to which the central control unit is attached is a central portion of the article of clothing, readily accessible to the operator, and wherein the at least one movement detection module, the at least one data receptor unit, and the at least one impulse generator unit are symmetrically arranged with respect to the central portion of the article of clothing.

6. The interactive movement detection system according to claim 1, wherein the article of clothing is at least one of a jacket, a sweater, a jersey, a T-shirt, a shirt, a sweatshirt, a windbreaker, sportswear, a vest, safety and/or protective equipment, pants, footwear, a caps or gloves.

7. The interactive movement detection system according to claim 6, wherein the first region to which the central control unit is attached is in one of:
 a central rear region of a top part of a back of a sweatshirt, a T-shirt, or a jacket;
 a region of hips or near a waist in pants;
 a central part of a visor of a cap;
 a lateral part of a piece of footwear; or
 a region of a back of a hand in a glove.

8. The interactive movement detection system according to claim 6, wherein the first region to which the central control unit is attached is a region of hips or a waist of pants.

9. The interactive movement detection system according to claim 6, wherein the first region to which the central control unit is attached is a central part of a visor of a cap.

10. The interactive movement detection system according to claim 6, wherein the first region to which the central control unit is attached is in a lateral part of a piece of footwear.

11. The interactive movement detection system according to claim 6, wherein the first region to which the central control unit is attached is a region of a back of a hand in a glove.

12. The interactive movement detection system according to claim 1, wherein the second region to which the at least one movement detection module attached is clothing region near bending points corresponding to body joints; wherein the third region to which the at least one data receptor unit is attached is near regions readily accessible to the wearer of the article of clothing to facilitate voluntary operation to carrying out control actions, the at least one receptor unit being at least one of a button, a switch or a pressure sensor; and wherein the fourth region to which the at least one impulse generator unit is attached is the regions of the article of clothing selected to simulate events caused by interaction with physical elements simulating mechanical interactions with virtual surroundings.

13. The interactive movement detection system according to claim 12, wherein the fourth region to which the at least one impulse generator unit is a region of the article of clothing located near a highly sensitive region of the wearer's body where an action is simulated.

\* \* \* \* \*